I. COOPER.
WATER SUPPLY FAUCET ATTACHMENT.
APPLICATION FILED OCT. 13, 1920.
1,434,945.
Patented Nov. 7, 1922.
2 SHEETS—SHEET 1.
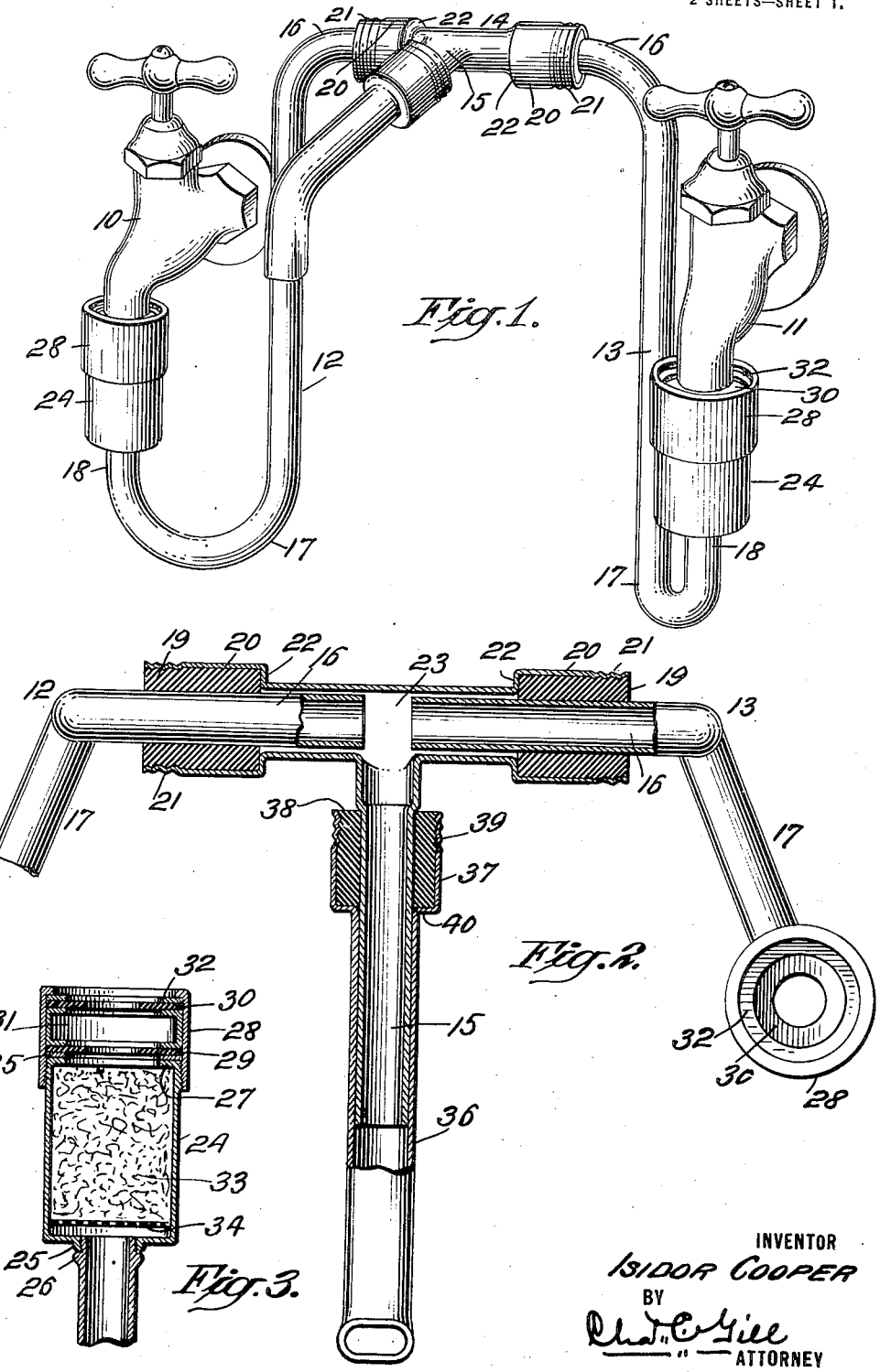
INVENTOR
ISIDOR COOPER
BY
Rich. C. Gill
ATTORNEY

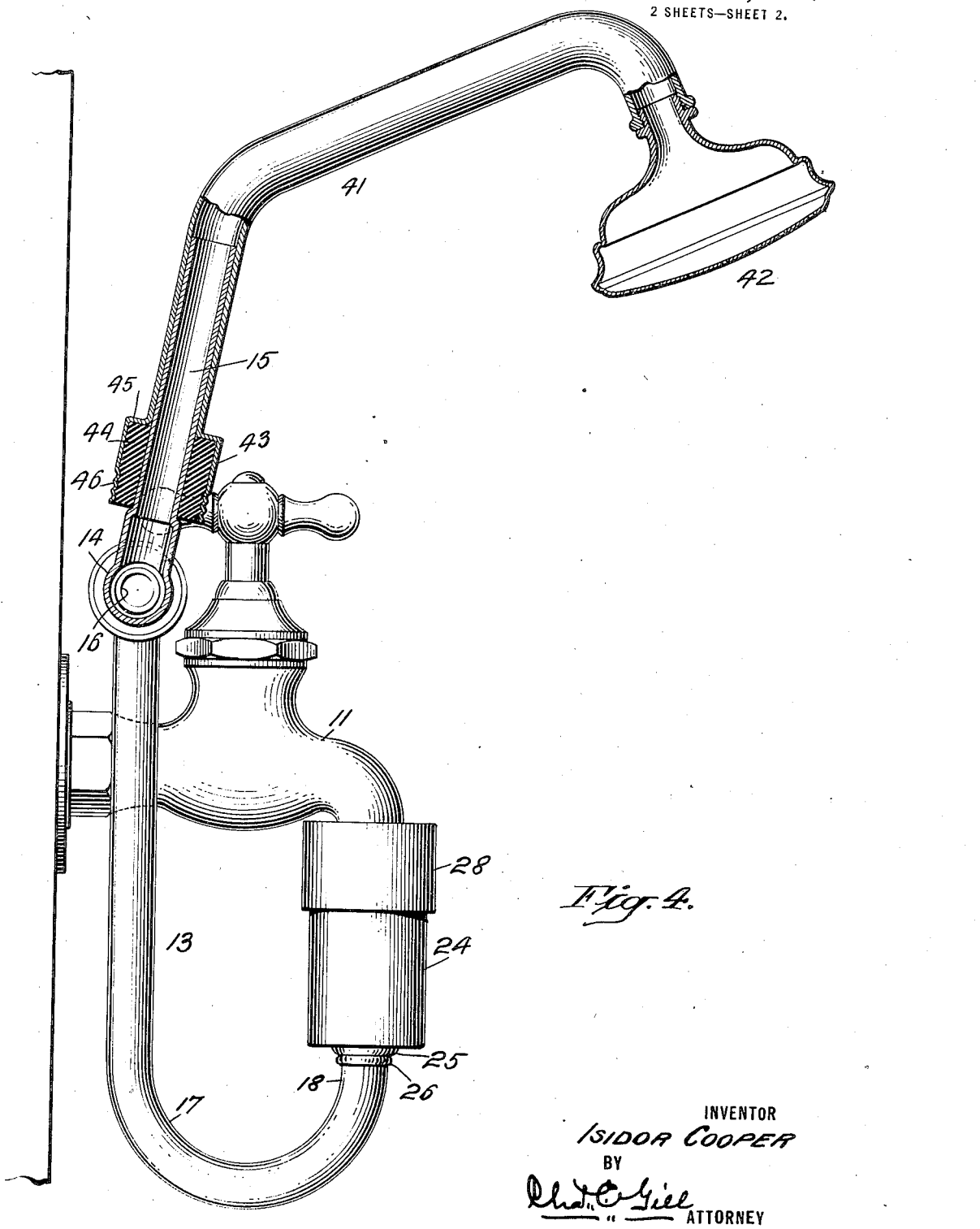

Patented Nov. 7, 1922.

1,434,945

UNITED STATES PATENT OFFICE.

ISIDOR COOPER, OF BROOKLYN, NEW YORK.

WATER-SUPPLY-FAUCET ATTACHMENT.

Application filed October 13, 1920. Serial No. 416,661.

*To all whom it may concern:*

Be it known that I, ISIDOR COOPER, a citizen of the Unitd States, and resident of Brooklyn, in the county of Kings and State of New York, have invented certain new and useful Improvements in Water-Supply-Faucet Attachments, of which the following is a specification.

The invention pertains more particularly to an attachment for twin faucets, such as may be found in kitchen sinks, bath tubs and the like, one faucet being designed for the delivery of cold water and the other for hot water.

The purpose of the invention is to provide an attachment which may be conveniently applied to and removed from the faucets and which will assure the commingling of the hot and cold water so that on the discharge of the same the water may have the desired temperature. A further purpose of the invention is to provide for the filtering of the water whenever so desired. I am aware that attachments for twin faucets are not broadly new, but my experience is that twin faucet attachments as heretofore constructed have been complex and expensive and not adapted in a convenient manner to the twin faucets found at the kitchen sinks of houses and apartments of usual type. One purpose of my invention is to provide a very simple and conveniently applied twin faucet attachment and one which may be readily removed from the faucets whenever desired and thereafter be conveniently restored to the faucets, and a further object of the invention is to provide an attachment which is adjustable to the spacing or distance between the faucets. A still further object of the invention is to provide an attachment whose parts may be assembled and applied to the faucets in a manner to avoid leakage. Another purpose of the invention is to provide means for making it possible to turn the discharge spout from the attachment angularly to either side, to reverse the spout, or turn it upside down, whenever desired, to elongate the spout to reach vessels of different character, and to otherwise render the discharge spout applicable for various purposes, one being, for illustration, to receive a spraying nozzle and permit the nozzle to be given such elevation and inclination as may be desired.

The invention will be fully understood from the detailed description hereinafter presented, reference being had to the accompanying drawings, in which:

Fig. 1 is a perspective view of the attachment of my invention shown applied to two faucets of usual construction and arrangement;

Fig. 2 is a top view, partly broken away and partly in horizontal section, of the same, the discharge spout in this instance being illustrated as reversed or turned upside down from the position in which the spout is shown in Fig. 1;

Fig. 3 is a central vertical section, partly broken away, through one terminal branch of the attachment and illustrates the means provided by me for connecting the attachment to the faucets and also, when desired, for filtering the water, and Fig. 4 is a side elevation, partly in section, of the attachment and illustrates the application of a spraying nozzle to the discharge nozzle of the attachment.

In the drawings 10, 11, designate two faucets of the usual type, one being intended for hot water and the other for cold water.

The attachment of my invention comprises two branch tubes 12, 13, respectively, connected at their outer ends with the faucets and at their upper inner ends with a coupling 14 from which a discharge nozzle or tube 15 extends frontwardly.

The branch tubes 12, 13 are alike and each has an upper inwardly extending portion 16 and a lower forwardly and outwardly extending or diverging portion 17 which curves downwardly and then upwardly to create a vertical member 18. The upper inwardly extending portions 16 of the branches 12, 13 are slidably inserted within close-fitting elongated plugs of rubber or other suitable material 19 which are held within enlargements 20 at the outer ends of the coupling 14, as shown in Fig. 2, the outer ends of said enlargements 20 being threaded, as at 21, to engage the plugs 19 and hold the same in place. At the inner ends of the enlargements 20 are formed annular inwardly extending shoulders 22 against which the inner ends of the plugs 19 abut, said shoulder serving to prevent the plugs 19 from sliding unduly inwardly during the insertion of the tube members 16 thereinto or to the position shown in Fig. 2. The screw-threads 21 are formed in the metal of the enlargements 20, and they serve to prevent the plugs 19 from sliding outwardly from the coupling 14 during such times as the members 16 of the tubes may, for illustration, be slid outwardly in the adjustment of the branches 12, 13 between faucets 10 and 11 of varied spacing or separation. At its middle portion the coupling 14 forms within it a chamber 23 which receives the hot and cold water and permits a commingling of the same and a flow of the water directly into the discharge nozzle or tube 15. The nozzle or discharge tube 15 may be integral with the coupling 14 and thus the formation of joints between said coupling and nozzle may be avoided. The plugs 19 being of rubber or like packing material serve to pack the ends of the coupling 14 in relation to the tube members 16, and while permitting of the adjustment of said members with relation to the coupling or the adjustment of the coupling with relation to said members prevent leakage around the said members 16 or between said plugs and the inner surfaces of the enlargements 20 of the coupling 14.

The branches 12, 13 between their inwardly extending portions 16 and outwardly extending portions 17 are substantially vertical, and the outward flaring or divergence of the lower portion 17 of said branch pipes or tubes permits the vertical end portions 18 of said branches to stand directly below the faucets 10, 11, while the main body of said branch tubes or pipes lie close to the wall and between the faucets.

Upon the upper ends of the members 18 of the piping 12, 13 are mounted cylindrical casings 24 having threaded lower neck portions 25 which engage the threaded upper ends of the members 18 and seat against an annular shoulder 26 on said members 18. The cylindrical casings 24 are partly closed in at their upper ends by an inwardly extending annular flange 27, which is open at its center, and upon the upper ends of the casings 24 are provided sleeves 28 which are internally threaded at their lower ends and screwed upon the upper ends of the casings 24. Within the sleeves 28 are provided a lower rubber diaphragm 29, an upper rubber diaphragm 30, and an intermediate cylindrical spacer 31 which separates the two diaphragms and at its upper and lower annular edges affords seats therefor. The diaphragms 29, 30 and spacer or ring 31 have open centers, the openings in the diaphragms being somewhat less in diameter than the opening in the spacing ring 31. The upper end of the sleeves 28 is undercut to form a shoulder to be engaged by a washer 32 which is directly upon the upper edge of the diaphragm 30 and serves as a means for preventing said diaphragm from being pulled upwardly out of the sleeve 28 when said sleeve is pressed downwardly from a faucet. The cylindrical casings 24 may receive a filtering substance 33 should it be desired to filter the water, said filtering substance being supported upon a perforated plate 34 located at the bottom of each casing 24, as shown in Fig. 3. The sleeves or caps 28 are removable, and hence it will be found convenient to renew the filtering substance 33 whenever desired. A further advantage in having the sleeves or caps 28 removable is that in assembling the parts a cap 28 may be turned upside down and have the washer 32 inserted in place and then the diaphragm 30 may be inserted within the cap and against said washer, and thereafter the spacing ring 31 may be introduced against the diaphragm 30, after which the diaphragm 29 may be inserted and pressed firmly against the ring 31, thus completing the assembly of the cap 28 and its parts. Thereafter the sleeve or cap 28 having received its interior parts may be turned to correct upright position and screwed upon the casing 24, the upper flange 27 of said casing engaging the lower surface of the diaphragm 29 or a metal washer 35 and cooperating with the ring 31 in maintaining said diaphragm 29 in correct position. The casings 24 are, as hereinbefore explained, mounted upon the vertical members 18 of the branches 12, 13, and when it is desired to apply the attachment to position the coupling 14 and branches 12, 13 will be moved toward the adjacent wall so as to carry the casings 24 and sleeves 28 below the faucets 10, 11. The attachment may then be lifted so as to force the sleeves 28 upon the discharge members of the faucets, the diaphragms 29, 30 passing upwardly upon and very closely engaging the faucets so as to form a tight joint around the faucets and prevent leakage either around the faucets or around the outer edges of the sleeves 28. The diaphragms 29, 30 will yield downwardly when being pressed upwardly against the faucets, and their engagement with the faucets will be rendered more secure when the water is turned on by the pressure of the water against the lower surfaces of said diaphragms.

The nozzle 15 is of tubular form and constitutes the discharge from the coupling 14, and said nozzle 15 may be used alone, if desired, for the discharge of the water from the attachment, in which event the outer end of the nozzle should be bent downwardly. In accordance with my present invention I increase the capacity of the attachment by applying upon the nozzle or tube 15 a spout 36 which is tubular and has a downwardly bent outer end and is telescopically applied upon the nozzle 15 so as to be slid inwardly and outwardly, as occasion may require or render convenient.

The spout 36 has an enlarged inner end 37 which contains a plug 38 of rubber or other suitable packing material having a center opening adapted to be slid upon the nozzle 15 and prevent leakage around said nozzle. The enlargement or hub 37 may be formed integrally with the spout 36 and at its inner end is threaded or grooved, as at 39, to grip the plug 38 and prevent the withdrawal of the plug when the spout is pulled outwardly to extend the length of the discharge from the attachment. At the outer end of the enlargement or hub 37 is formed a shoulder 40 against which the outer end of the plug 38 may abut and which serves to hold the plug 38 in correct position during the inward movement of the spout 36 along the nozzle 15. The spout 36 constitutes an important feature of the present invention and widens the utility of the attachment. The downwardly bent forward end of the spout 36 may be utilized to discharge the water downwardly into a receptacle placed below it, and said end on the axial movement of the spout 36 on the nozzle 15 may be deflected toward the right or toward the left as may be required for different vessels which may be placed in a sink to receive the water, or to direct the water toward different ends of a sink on occasions in which it may be desired to clean the sink. The fact that the spout may be turned angularly on the nozzle 15 is of considerable importance in directing the water either toward the right or toward the left or downwardly, and it is also of increased importance in that it permits the spout 37 to be given an one-half rotation so that the forward bent end of the spout may be turned upwardly to the position shown in Fig. 2 from that illustrated in Fig. 1. When the forward end of the spout 36 is turned upwardly the discharge of the water will be in an upward direction and the flow from the spout may be so regulated by the manipulation of the faucet 10 or 11 or both that the water will discharge upwardly at reduced pressure and be utilized as a fountain for drinking purposes, without the use of a cup, or for washing the teeth or mouth or for other purposes. This last feature of utility with respect to the spout 36 has been found to be of considerable convenience, and when only the cold water is admitted to the attachment the spout 36 when turned upwardly becomes a sanitary drinking fountain, meeting all the requirements of much more expensive drinking fountains at present found in public places. The spout 36 is angularly mounted on the nozzle 15 for the several purposes already stated, and said spout is telescopically mounted on the nozzle 15 so that it may be slid inwardly or pulled outwardly to meet the requirements of the different vessels which may be placed in a sink to receive water or to facilitate the use of the attachment and sink in washing a person's face or head. The coupling 14 is capable of angular movement on the ends 16 of the tubes 12, 13, and hence the spout 36 may not only have the angular movements hereinbefore described imparted to it, but may be turned upwardly or downwardly on a radial line with the angular adjustment of the coupling 14.

For all usual purposes the spout 36 will be of the shape illustrated in Figs. 1 and 2, but in other instances the spout 36 may be given the form shown in Fig. 4, wherein I number the spout 41 and provide on one end thereof a spraying nozzle 42, which is detachable and may be used or not, as may be preferred. The spraying nozzle 42 is intended for use on washing one's head or washing vegetables, as well as for other purposes. The nozzle 41 is in the shape of a bent tube, so that the spraying nozzle 42 may be given a convenient angle and position, and at its inner end said tube or spout 41 is correspondingly constructed with the inner end of the spout 36 in that it has an enlargement 43 to receive the plug 44 and afford a shoulder 45 against which the outer end of the plug 44 may abut. The enlargement 43 is also formed with grooves or threads 46 to aid in holding the plug 44 in position. The spout or tube 41 is telescopically mounted on the nozzle or tube 15, and it may be turned angularly on said nozzle or tube so as to carry the discharge from the spout or tube 41 to a convenient location for any use to which the attachment may be put. The attachment shown in Fig. 4 is the same as that shown in Fig. 1 with the exception of the formation or outline of the discharge tube or spout 41, and the application thereto of the spraying nozzle 42. I present Fig. 4 to indicate that my invention is not altogether limited to the particular configuration of the discharge spout or nozzle 36; and I contemplate additional forms for the discharge spout or nozzle 36 which I do not deem it necessary to illustrate in the drawings and which serve to adapt the attachment for various uses. In each instance, however, the invention represented by the inner end of the discharge spout in connection with the nozzle or tube 15 and coupling 14 will be present, the modifications residing in the formation of the outer portion of the discharge spout.

The attachment in its entirety may be applied to the faucets, and said attachment is adjustable to faucets varying in diameter at their delivery ends and also to faucets varying in their spacing apart, the adjustment to faucets varying in their distance of separation being provided for in my arrangement of the tube or pipe members 16, plugs 19 and coupling 14. It will readily be seen that either or both of the tube members 18 may be adjusted inwardly or outwardly in accordance with special requirements.

My invention as a whole has been designed with a view of providing a very efficient easily applied and comparatively inexpensive device for application to twin faucets whereby the water from the faucets may be commingled, and drawn from one delivery and either filtered or not, as may be preferred. My attachment is adaptable to varying conditions that may be met with in the shape of faucets and in their distance of separation, and as a whole my attachment has proven to be one of efficiency and one capable of being managed by the usual householder. The various uses to which the attachment may be applied due to the fact that the coupling 14 may be angularly adjusted or turned and the discharge spout 36 angularly adjusted or axially turned, have been sufficiently pointed out hereinbefore.

I direct special attention to the fact that my attachment is composed mainly of four integral parts all devoid of joints or other expensive features requiring care and detrimental to the appearance of the fixture, these four parts being the integral jointless tubes 12, 13, the head-tube 14 carrying the nozzle 15 and the discharge spout 36. The tubes 12, 13 curve forwardly and outwardly at their lower portions on graceful curves and at their upper portions curve toward each other and enter the head-tube 14. The main body of my attachment stands back against the wall and between the vertical planes of the faucets, which is a very desirable feature of my attachment and which is rendered possible by the lower diverging portions 17 of the tubes 12, 13. My attachment is one which is not only desirable by reason of its minimum number of joints but on account of its smooth surfaces, lack of complexity, shape, appearance and relative proportions, and also on account of the fact that its main body portion stands back against the wall out of the way.

What I claim as my invention and desire to secure by Letters-Patent, is:

1. A twin faucet attachment comprising a tubular coupling member to lie between the faucets and having a forwardly projecting discharge and enlarged end portions containing apertured plugs of packing material, and substantially vertical tubular branch members having inwardly extending upper ends entered within said plugs and divergent lower ends which curve downwardly and then upwardly to provide vertical terminals below and for removable connection with the discharge ends of said faucets, said coupling member being capable of angular axial movement for positioning said discharge, said discharge comprising a nozzle rigid with said coupling member and a spout adjustable thereon and removable therefrom, and said branch members each being of tubing whose upper end curves inwardly toward said coupling member and whose lower portion while curved as described also extends forwardly and outwardly, whereby the body of the tube is adapted to set backwardly of the front of the faucets.

2. A twin faucet attachment comprising a tubular coupling member to lie between the faucets and having a forwardly projecting discharge, and substantially vertical tubular branch members having inwardly extended upper ends connected with the ends of said coupling member and divergent lower ends which curve downwardly and then upwardly to provide vertical terminals below and for removable connection with the discharge ends of said faucets, said discharge comprising a nozzle rigid with said coupling member and a spout adjustable telescopically and angularly about its axis thereon and having a deflected discharge end portion, and said branch members each being of tubing whose upper end curves inwardly toward said coupling member and whose lower portion while curved as described also extends forwardly and outwardly, whereby the body of the tube is adapted to set backwardly of the front of the faucets.

3. A twin faucet attachment comprising a tubular coupling member to lie between the faucets and having a forwardly projecting discharge, and substantially vertical tubular branch members having inwardly extended upper ends connected with the ends of said coupling member and divergent lower ends which curve downwardly and then upwardly to provide vertical terminals below and for removable connection with the discharge ends of said faucets, the connection of said coupling member and branch members permitting said coupling member to be turned angularly for positioning said discharge, said discharge comprising a nozzle rigid with said coupling member and a spout mounted thereon and capable of axial angular movement for positioning its discharge end, and said branch members each being of tubing whose upper end curves inwardly toward said coupling member and whose lower portion while curved as described also extends forwardly and outwardly, whereby the body of the tube is adapted to set backwardly of the front of the faucets.

4. A twin faucet attachment comprising a tubular coupling member to lie between the faucets and having a forwardly projecting discharge, and substantially vertical tubular branch members having inwardly extended upper ends connected with the ends of said coupling member and divergent lower ends which curve downwardly and then upwardly to provide vertical terminals below and for removable connection with the discharge ends of said faucets, the connection of said coupling member and branch members permitting said coupling member to be turned angularly for positioning said discharge, said discharge comprising a nozzle rigid with said coupling member and a spout slidably mounted thereon and having a deflected discharge end and at its other end an enlargement carrying packing material slidable on said nozzle and rotatable around the same, whereby said spout is capable of being extended and also turned axially on said nozzle for positioning its deflected discharge end, and said branch members each being of tubing whose upper end curves inwardly toward said coupling member and whose lower portion while curved as described also extends forwardly and outwardly, whereby the body of the tube is adapted to set backwardly of the front of the faucet.

5. A twin faucet attachment comprising a tubular coupling member to lie between the faucets and having a forwardly projecting discharge spout, substantially vertical tubular branch members having inwardly extended upper ends connected with the ends of said coupling member and divergent lower ends which curve downwardly and then upwardly to provide vertical terminals below said faucets, and casings mounted on said terminals and provided with apertured yielding diaphragms to be pushed upwardly on and closely engage said faucets, said branch members each being one integral piece of tubing whose upper end curves inwardly toward said coupling member and whose lower portion while curved as described also extends forwardly and outwardly, whereby the body of the tube is adapted to set backwardly of the front of the faucets.

6. A twin faucet attachment comprising a tubular coupling member to lie between the faucets and having a forwardly projecting discharge spout, substantially vertical tubular branch members having inwardly extended upper ends connected with the ends of said coupling member and divergent lower ends which curve downwardly and then upwardly to provide vertical terminals below said faucets, and casings mounted on said terminals, said casings having removable caps each containing two apertured yielding diaphragms to be pushed upwardly on and closely engage the faucet and means spacing the diaphragms apart, said branch members each being one integral piece of tubing whose upper end curves inwardly toward said coupling member and whose lower portion while curved as described also extends forwardly and outwardly, whereby the body of the tube is adapted to set backwardly of the front of the faucets.

7. A twin faucet attachment comprising a tubular coupling member to lie between the faucets and having a forwardly projecting discharge spout and enlarged end portions which provide shoulders at their inner ends and are threaded at their outer ends, apertured plugs of packing material filling said enlargements and held by said threads and said shoulders, substantially vertical tubular branches having inwardly extending upper ends entered within said plugs and lower portions which curve downwardly and then upwardly toward the faucets, and means for removably connecting said lower portions with the discharge ends of said faucets, said branch members each being one integral piece of tubing whose upper end curves inwardly toward said coupling member and whose lower portion while curved as described also extends forwardly and outwardly, whereby the body of the tube is adapted to set backwardly of the front of the faucets.

8. A twin faucet attachment comprising a tubular coupling member to lie between the faucets and having a forwardly projecting discharge spout, substantially vertical tubular branch members having inwardly extended upper ends connected with the ends of said coupling member and divergent lower ends which curve downwardly and then upwardly to provide vertical terminals below said faucets, casings mounted on said terminals, said casings each having an inwardly flanged upper edge, a cap threaded on the upper end of the casing and having an inwardly extending upper flange and provided with two apertured yielding diaphragms to be pushed upwardly on and closely engage the faucet and a spacing ring separating said diaphragms, and said cap serving to bind said diaphragms firmly in position, said branch members each being one integral piece of tubing whose upper end curves inwardly toward said coupling member and whose lower portion while curved as described also extends forwardly and outwardly, whereby the body of the tube is adapted to set backwardly of the front of the faucets.

9. A twin faucet attachment comprising a discharge spout, substantially vertical tubular branches communicating at their upper portions with said spout and having lower portions which are adapted to extend below the discharge ends of the faucets, casings mounted on the terminal ends of said lower portions and each having an inwardly flanged upper edge, a cap threaded on the upper end of each casing and having an inwardly extending upper flange and two apertured yielding diaphragms to be pushed upwardly on and closely engage the faucet and a spacing ring separating said diaphragms, said cap serving to bind said diaphragms firmly in position.

10. A twin faucet attachment comprising a discharge spout, substantially vertical tubular branches communicating at their upper portions with said spout and having lower portions which are adapted to extend below the discharge ends of the faucets, casings mounted on the terminal ends of said lower portions, said casings each having an inwardly flanged upper edge, a cap threaded on the upper end of the casing and having an inwardly extending upper flange and two apertured yielding diaphragms to be pushed upwardly on and closely engage the faucet and a spacing ring separating said diaphragms, and said cap serving to bind said diaphragms firmly in position, said branch members each being one integral piece of tubing whose upper end curves inwardly toward said coupling member and whose lower portion while curved as described also extends forwardly and outwardly, whereby the body of the tube is adapted to set backwardly of the front of the faucets.

11. A twin faucet attachment comprising a tubular coupling member to lie between the faucets and having a forwardly projecting discharge, and substantially vertical tubular branch members having inwardly extending upper ends connected with the ends of said coupling member and divergent lower ends which curve downwardly and then upwardly to provide vertical terminals below and for removable connection with the discharge ends of said faucets, and said branch members each being of tubing whose upper end curves inwardly toward said coupling member and whose lower portion while curved as described also extends forwardly and outwardly, whereby the body of the tube is adapted to set backwardly of the front of the faucets.

Signed at New York city, in the county of New York, and State of New York, this 11th day of October, A. D. 1920.

ISIDOR COOPER.